(12) United States Patent
Seo et al.

(10) Patent No.: US 10,411,981 B2
(45) Date of Patent: Sep. 10, 2019

(54) METHOD AND SYSTEM FOR DETECTING CLIENT CAUSING NETWORK PROBLEM USING CLIENT ROUTE CONTROL SYSTEM

(71) Applicants: Jeong Hoan Seo, Seoul (KR); Young Suk Lim, Seoul (KR)

(72) Inventors: Jeong Hoan Seo, Seoul (KR); Young Suk Lim, Seoul (KR)

(*) Notice: Subject to any disclaimer, the term of this patent is extended or adjusted under 35 U.S.C. 154(b) by 102 days.

(21) Appl. No.: 15/319,684

(22) PCT Filed: Jun. 18, 2015

(86) PCT No.: PCT/KR2015/006194
§ 371 (c)(1),
(2) Date: Dec. 16, 2016

(87) PCT Pub. No.: WO2015/194885
PCT Pub. Date: Dec. 23, 2015

(65) Prior Publication Data
US 2017/0141984 A1 May 18, 2017

(30) Foreign Application Priority Data

Jun. 20, 2014 (KR) ........................ 10-2014-0075888

(51) Int. Cl.
*H04L 12/26* (2006.01)
*H04L 12/22* (2006.01)
(Continued)

(52) U.S. Cl.
CPC .......... *H04L 43/0847* (2013.01); *H04L 12/22* (2013.01); *H04L 43/00* (2013.01);
(Continued)

(58) Field of Classification Search
None
See application file for complete search history.

(56) References Cited

U.S. PATENT DOCUMENTS 6,829,654 B1 12/2004 Jungck
2005/0259645 A1 11/2005 Chen et al.
(Continued)

FOREIGN PATENT DOCUMENTS

CN 102148752 A 8/2011
KR 10-2009-0049936 A 5/2009
(Continued)

OTHER PUBLICATIONS

EPO; App. No. EP15808915; Supplementary European Search Report and Opinion dated Jan. 19, 2018.
(Continued)

*Primary Examiner* — Younes Naji
(74) *Attorney, Agent, or Firm* — Fitch, Even, Tabin & Flannery LLP

(57) ABSTRACT

Provided are a method and a system for identifying an IP of a DDoS attack orderer by using a client route control server. A method for detecting a network problem-causing client by using a client route control server includes: forming an edge server IP allocation matrix; checking a network problem occurrence in an edge server; allocating an edge server IP according to the edge server IP allocation matrix when a network problem occurs in an edge server; and detecting user information or a client IP, which has no edge server IP to be allocated according to the edge server IP allocation matrix, as a network problem-causing client, wherein an edge server IP is allocated differently for each user information or client IP in the edge server IP allocation matrix, and the edge server IP allocation is performed by at least two-stage edge server IP for each user information or client IP.

15 Claims, 14 Drawing Sheets

(51) Int. Cl.
*H04L 29/12* (2006.01)
*H04L 29/06* (2006.01)

(52) U.S. Cl.
CPC ...... *H04L 61/1511* (2013.01); *H04L 61/2007* (2013.01); *H04L 63/1458* (2013.01); *H04L 67/42* (2013.01); *H04L 2463/142* (2013.01)

(56) References Cited

U.S. PATENT DOCUMENTS

| | | |
|---|---|---|
| 2006/0075084 A1 | 4/2006 | Lyon |
| 2008/0062997 A1* | 3/2008 | Nix .................. H04L 29/12066 370/395.2 |
| 2011/0138467 A1 | 6/2011 | Macwan et al. |
| 2015/0358401 A1* | 12/2015 | Flavel ................. H04L 67/1095 370/235 |

FOREIGN PATENT DOCUMENTS

| | | |
|---|---|---|
| KR | 10-2011-0036418 A | 4/2011 |
| KR | 10-2013-0103145 A | 9/2013 |
| WO | 2012/083800 A1 | 6/2012 |

OTHER PUBLICATIONS

International Search Report dated Aug. 25, 2015 for PCT/KR2015/006194 and English translation of the same. (4 pages).
CPO; Application No. 201580032970.2; Office Action dated Dec. 5, 2018.

* cited by examiner

METHOD AND SYSTEM FOR DETECTING CLIENT CAUSING NETWORK PROBLEM USING CLIENT ROUTE CONTROL SYSTEM

CROSS-REFERENCE TO RELATED APPLICATIONS

This application is a U.S. National Phase Patent Application of International Patent Application Number PCT/KR2015/006194, filed on Jun. 18, 2015, which claims priority of Korean Patent Application Number 10-2014-0075888, filed Jun. 20, 2014, which are hereby incorporated herein by reference in their entirety.

TECHNICAL FIELD

The inventive concept relates to detecting a client causing a network problem, and more particularly, to a method and a system for detecting a network problem-causing client by using a client route control system.

BACKGROUND ART

Detecting a network problem-causing client by using a client route control system, for example, identifying an Internet Protocol (IP) of a distributed denial-of-service (DDoS) attack orderer may refer to detecting and identifying a DDoS attack by controlling a client route by designating an edge server to be accessed by a user by using a domain name server (DNS) and a client route control server and several edge servers.

DDoS attacks may be generally classified into two types. The first-type DDoS attack may paralyze the server by burdening the server with an excessive load. When such an attack occurs, the server may be paralyzed by failing to process other jobs due to an excessive load thereon.

The second-type DDoS attack may disable a network line by overflowing the network line with traffic. When such an attack occurs, since the server may have no problem but the network line connected with the server may be disabled, the server and the client may not communicate with each other. That is, although the server may have no problem, since the network may have a problem, the service maintenance may become difficult. Although many DDoS security technologies have been developed in preparation for this situation, they fail to become fundamental solutions thereof.

For example, Honeynet is one of the DDoS defense technologies that have been widely used recently. The Honeynet may refer to a network including a plurality of honey pots. Herein, the honey pots may refer to virtual networks that are implemented to induce various external attacks to find a hacking trend thereof. This is a technology for intentionally exposing a virtual service with service components to a DDoS attack orderer to induce hacking. This technology is spotlighted because it may detect a hacker without affecting the server used in an actual service.

However, the honey pots constituting the Honeynet may have several problems. First, when a DDoS attack orderer identifies a honey pot, the DDoS attack orderer may reattack by avoiding the honey pot. That is, the once-used honey pot may be difficult to reuse. Also, in the case of using the honey pot to detect the DDoS attack orderer IP, it may be necessary to cause the attack orderer to remain on the honey pot until the attack orderer leaves sufficient evidence on the honey pot. Thus, it may be difficult to quickly cope with the DDoS attack. The biggest problem of the honey pot is that the honey pot may become useless when an attack (among the above DDoS attack types) occurs to cause excessive traffic in the network line.

There is a method for defending by Null Routing. The Null Routing may refer to a technology for deleting a packet by forwarding the packets for a particular destination to a virtual interface "Null 0". This technology may block a DDoS packet directed toward the server without causing an overload in the network equipment, but may provide only IP-based filtering and may not provide filtering based on service ports or contents.

There are various other defense technologies, but these conventional technologies have a common problem. The conventional DDoS defense technology may block a DDoS attack, but may not find and identify an IP of an attack orderer corresponding to an attacker thereof.

Also, when an attacked line or IP range is blocked in order to block a DDoS attack, even a normal user belonging to the relevant line or range may not use a service. This may cause a time loss and an excessive cost in service providers (e.g., financial institutions, public institutions, and games) that should maintain a service continuously 24 hours a day.

DETAILED DESCRIPTION OF THE INVENTION

The inventive concept provides a network problem-causing client detecting method using a client route control server, in which the client route control server may find and detect a network problem-causing client by providing a unique route to each client by combining several routes by using edge servers arranged in a plurality of stages.

The inventive concept also provides a network problem-causing client detecting system using a client route control server, in which the client route control server may detect and identify a network problem-causing client by providing a unique route to each client by combining several routes by using edge servers arranged in a plurality of stages.

According to an aspect of the inventive concept, a method for detecting a network problem-causing client by using a client route control system includes: forming an edge server IP allocation matrix; checking a network problem occurrence in an edge server; allocating an edge server IP according to the edge server IP allocation matrix when a network problem occurs in an edge server; and detecting user information or a client IP, which has no edge server IP to be allocated according to the edge server IP allocation matrix, as a network problem-causing client. An edge server IP may be allocated differently for each user information or client IP according to the edge server IP allocation matrix, and the edge server IP allocation may be performed by at least two-stage edge server IP for each user information or client IP.

The network problem occurrence check may be performed when a DNS query is received from a client. Also, the network problem occurrence check may be performed regardless of a DNS query from a client. When a network problem occurs in an edge server, user information or a client IP using the edge server having the network problem may be found and an edge server IP allocated for the found user information or client IP may be provided to the found client.

The clients may include an agent that transmits a DNS query in order to re-connect with another edge server allocated according to the edge server IP allocation matrix when a network problem occurs in an edge server. The agent may transmit a DNS query including user information.

The user information included in the DNS query may include user identification information or device identification information and may include, for example, at least one of Login ID, Device ID (e.g., MAC, CPU ID, or HDD Serial), Phone Number, and IP Address.

In the method, when a DNS query is received from the agent of the client, user information may be extracted from the DNS query of the client and an edge server IP corresponding to the extracted user information may be allocated to the client according to the edge server IP allocation matrix.

The edge server used in the method may connect a client and a server and may include at least one of a program, a server, and a hardware device that have a service relay function or a service function.

According to another aspect of the inventive concept, a system for detecting a network problem-causing client by using a client route control system includes: a network problem occurrence checking unit that checks a network problem occurrence in an edge server; an edge server allocating unit that has an edge server IP allocation matrix and allocates an edge server IP according to the edge server IP allocation matrix when a network problem occurs in an edge server; a DNS responding unit that provides an edge server IP allocated for each user information or client IP in response to a DNS query transmitted by a client; and a network problem-causing client detecting unit that detects user information or a client IP, which has no edge server IP to be allocated according to the edge server IP allocation matrix, as a network problem-causing client. An edge server IP may be allocated differently for each user information or client IP according to the edge server IP allocation matrix, and the edge server IP allocation may be performed by at least two-stage edge server IP for each user information or client IP.

The network problem occurrence checking unit may check, when an edge server is allocated by the edge server allocating unit in response to a DNS query, whether there is a network problem in the allocated edge server; and the DNS responding unit may provide the allocated edge server information to a client through a DNS when there is no network problem in the allocated edge server.

Also, the network problem occurrence checking unit may monitor a network problem in an edge server regardless of a DNS query. In this case, the network problem-causing client detecting unit may include a client finding unit that, when a network problem occurs in an edge server, finds user information or a client IP using the edge server having the network problem. The edge server allocating unit may allocate an edge server IP corresponding to the found user information or client IP according to the edge server IP allocation matrix; and the DNS responding unit may provide an edge server IP allocated for the found user information or client IP to the found client through a DNS when a DNS query is transmitted by a client corresponding to the found user information or client IP.

Also, the network problem occurrence checking unit may monitor a network problem in an edge server regardless of a DNS query; the network problem-causing client detecting unit may include a client finding unit that, when a network problem occurs in an edge server, finds user information or a client IP using the edge server having the network problem; the edge server allocating unit may allocate an edge server IP corresponding to the found user information or client IP according to the edge server IP allocation matrix; and the DNS responding unit may provide an edge server IP allocated for the found user information or client IP to the found client regardless of the DNS query.

The client may include an agent that transmits the DNS query in order to re-connect with another edge server allocated according to the edge server IP allocation matrix when a network problem occurs in an edge server.

The agent may transmit a DNS query including user information. The edge server allocating unit may include a user information extracting unit that, when a DNS query is received from the agent of the client, extracts user information from the DNS query of the client.

The user information included in the DNS query may include user identification information or device identification information and may include, for example, at least one of Login ID, Device ID (e.g., MAC, CPU ID, or HDD Serial), Phone Number, and IP Address.

The edge server may connect a client and a server and may include at least one of a program, a server, and a hardware device that have a service relay function or a service function.

According to another aspect of the inventive concept, a processor-readable recording medium stores a program for executing the above method by a processor.

The continuity of a service provided to the client may be secured by the network problem-causing client detecting method and system using the client route control system according to the inventive concept. That is, since the client may use at least two routes, the network communication thereof may be continuously maintained even when a network problem occurs in some routes.

According to another embodiment of the inventive concept, since a unique route is allocated for each client, the IP of DDoS attack orderer may be easily identified and the DDoS attack may be blocked. That is, since an edge server is pre-designated for each client, when a network problem occurs in the edge server, only the client causing the network problem may be immediately found. Accordingly, since only the client causing the network problem may be blocked, the user normally using the service may not be affected. Also, since the time taken to analyze the log for DDoS search may be reduced, the time loss thereof may be reduced.

The inventive concept may be universal because it designates the route based on the client information. In other words, since the inventive concept designates the route based on the client information, whatever method the client uses, it may necessarily be applied to a route designating system and thus use the route suitable thereto. This may be considerably universal in comparison to the ACL or Null Routing scheme that performs filtering by only the IP or port.

Also, various types of DDoS attacks may be blocked by the inventive concept. Since the inventive concept uses the edge server, the client may not directly connect with the server. Thus, since the DDoS attack orderer also may not directly interfere with the server, it may not directly make a DDoS attack on the server.

Even when the DDoS attack orderer makes an attack on a network line, since only the DDoS attack orderer is connected thereto, the system according to the inventive concept may block and defend against the attack without affecting other network lines.

Most of all, since the DDoS attack orderer corresponding to only one case may be found by a small number of edge servers, the cost and equipment required for security maintenance, the manpower required for management, and the time loss thereof may be significantly reduced.

DETAILED DESCRIPTION OF THE DRAWINGS

DETAILED DESCRIPTION OF THE PREFERRED EMBODIMENTS

Figure 1:
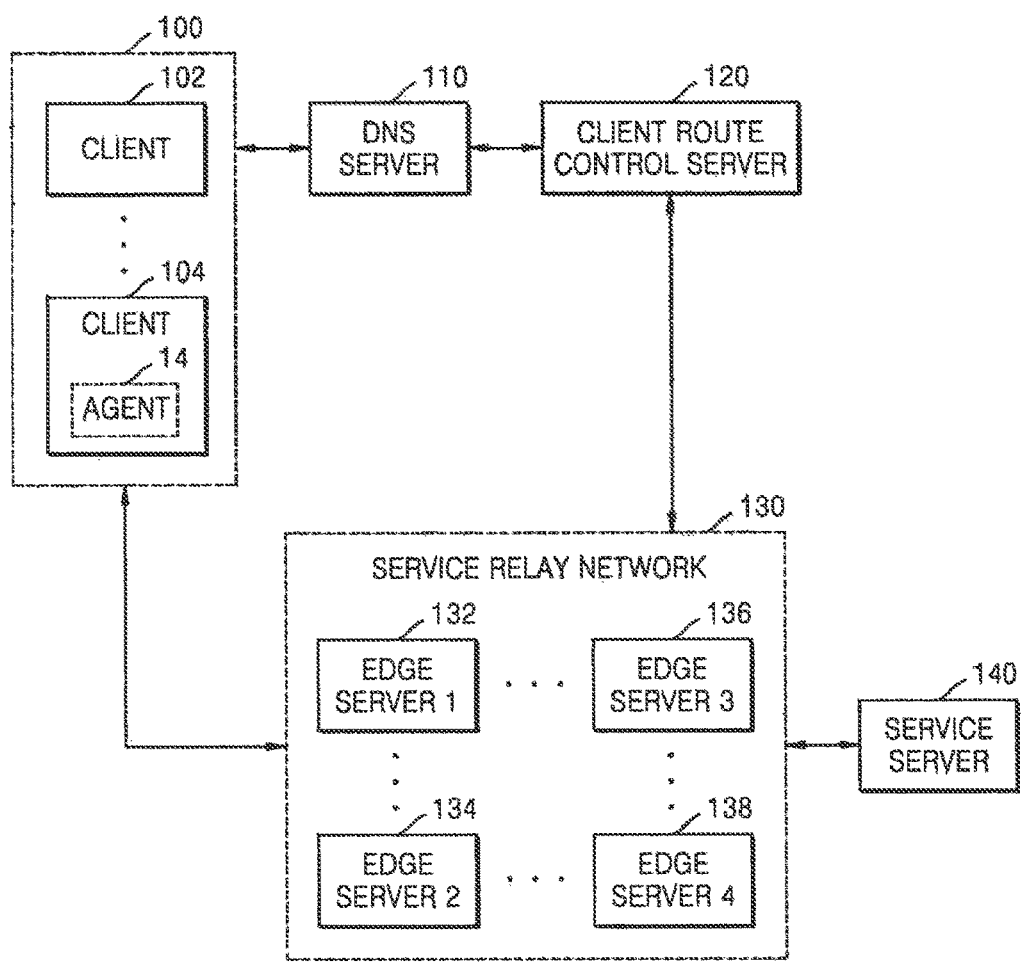
FIG. 1 is a block diagram illustrating an example of a configuration of an entire system to which the inventive concept is applied.

Hereinafter, exemplary embodiments of the inventive concept will be described in detail with reference to the accompanying drawings. Since the embodiments described herein and the configurations illustrated in the drawings are merely exemplary embodiments of the inventive concept and do not represent all of the inventive concept, it will be understood that there may be various equivalents and modifications thereof.

FIG. 1 is a block diagram illustrating an example of a configuration of an entire system to which the inventive concept is applied. The inventive concept may include a plurality of clients 100, a DNS server 110, a client route control server (CRCS) 120, a service relay network 130, and a service server 140.

In the inventive concept, the service relay network 130 may include an edge server including a hardware device or a server having a service relay function or a service function, and network devices such as a gateway, a router, a switch, and a hub.

In general, a network may include various servers such as a Web server and a DNS, and network devices such as a gateway, a router, a switch, and a hub. Among them, the server may receive a request of a client and process the request, and the network device may transmit a packet to be transmitted/received by the client. These devices may transmit a packet received from the client to the server through a fast route without loss, and the server may rapidly process a request of the client and transmit the result thereof to the client. However, these devices may be weak such that they are incapable of coping with a possible problem in the device or line.

In order to implement the inventive concept, an edge server used in the inventive concept may be implemented by a hardware device and a server such as a proxy server or a cache server having a service relay function or a service function. Also, the edge server may include a program having a service relay function or a service function and may function as a service server that is accessed by the client and is used as a service route accessed by the client.

When the client 100 accesses a server, most clients access the service server 140 by using a DNS. The inventive concept may be implemented by using edge servers 132, 134, 136, and 138, the CRCS 120 managing the same, DNS features, and a route generated by combining a plurality of routes.

The client 100 may access the service server 140 to receive a service. In this case, first, the client 100 may receive an IP of the service server 140 through the DNS server 110. For this purpose, the client 100 may transmit a DNS query to the DNS server 110.

The DNS server 110 may receive the DNS query from the clients 102 and 104 and transmit the DNS query to the CRCS 120 when the IP of the service server is not stored therein.

The CRCS 120 may receive the DNS query of the client from the DNS server 110, allocate the IP of the edge server belonging to the service relay network 130, and transmit the allocated IP of the edge server to the client through the DNS server 110.

In more detail, the CRCS 120 may check the state of the edge server and manage the data of the edge server and the client. The CRCS 120 may designate the edge server IP and transmit the same to the client. The CRCS may receive a DNS request, check the state of the edge server, designate the IP of the edge server corresponding to the client IP or the domain name and the client IP, store the designated information, and transmit a DNS response.

The client transmitting the DNS query may receive the IP information of the edge server, access the edge server, and receive a service from the service server 140.

In more detail, the client 100 may transmit the DNS query to the DNS server 110 in order to find the address of the server. When the domain name requested by the client does not exist in its own server, the DNS server 110 may find the IP corresponding to the domain name by transmitting a request to the upper DNS server.

In more detail, the DNS server may include a general DNS device that receives the domain name requested by the client and responds by the IP corresponding to the domain name, and may also include the corresponding concept and technology. The DNS server may transmit the IP corresponding to the domain name to the client.

Through the above process, the DNS query may be transmitted to the CRCS 120 having the client IP and the domain name requested by the client. In this case, according to a route control algorithm, the CRCS 120 may prepare the IP of the edge server used in a unique route for each client IP.

Figure 2:
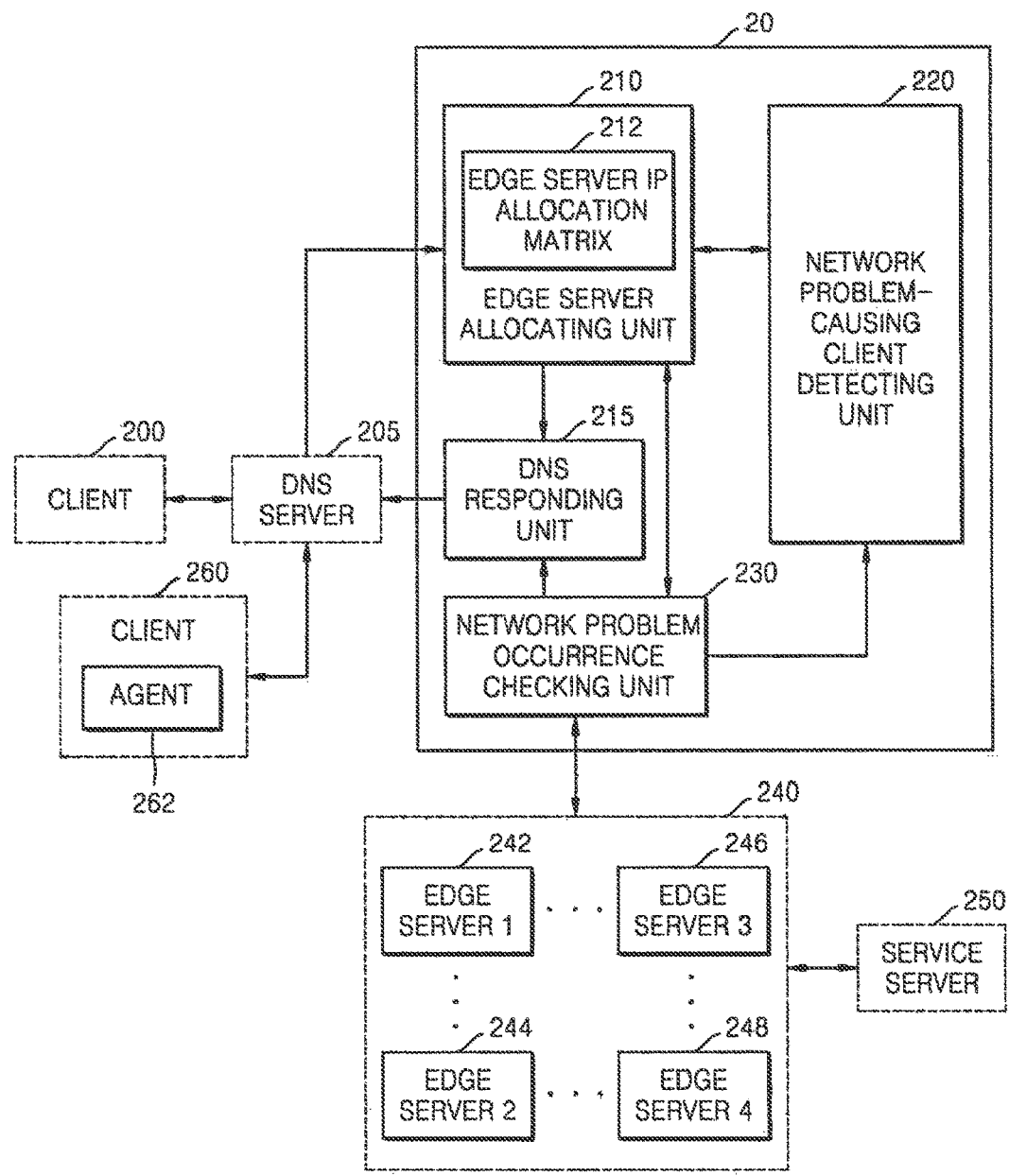
FIG. 2 is a block diagram illustrating an overall configuration of a network problem-causing client detecting system using a client route control server according to the inventive concept.

FIG. 2 is a block diagram illustrating an overall configuration of a network problem-causing client detecting system using a client route control server according to the inventive concept. Referring to FIG. 2, an example of a network problem-causing client detecting system 20 using a client route control server according to the inventive concept may include an edge server allocating unit 210, a DNS responding unit 215, a network problem occurrence checking unit 230, and a network problem-causing client detecting unit 220.

The network problem occurrence checking unit 230 may check whether a network problem occurs in an edge server 240.

The edge server allocating unit 210 may have an edge server IP allocation matrix 212 and allocate, when a network problem occurs in the edge server 240, an edge server IP to the client using the edge server having the network problem with reference to the edge server IP allocation matrix 212. An edge server IP may be allocated differently for each user information or client IP according to the edge server IP allocation matrix 212, and the edge server IP allocation may be performed by at least two-stage edge server IP for each user information or client IP.

The DNS responding unit 215 may provide an edge server IP allocated for each user information or client IP in response to a DNS query transmitted by the client.

In order to allocate, when a network problem occurs in the edge server, an edge server IP to the client using the edge server having the network problem with reference to the edge server IP allocation matrix 212, the network problem-causing client detecting unit 220 may detect user information or a client IP, which has no edge server IP to be allocated, as a network problem-causing client.

Herein, the edge server may be a program, a server, and a hardware device having a service relay function or a service function, such as a proxy server or a cache server. The edge server may be used as a service route accessed by the client and may function as a service server to which the client accesses.

A service relay network 240 may include an edge server including a hardware device or a server having a service relay function or a service function, and network devices such as a gateway, a router, a switch, and a hub.

Also, an agent 262 mounted in a client 260 may transmit a DNS query in order to re-connect the edge server and the clients connected to the edge server having the network problem.

Figure 6:
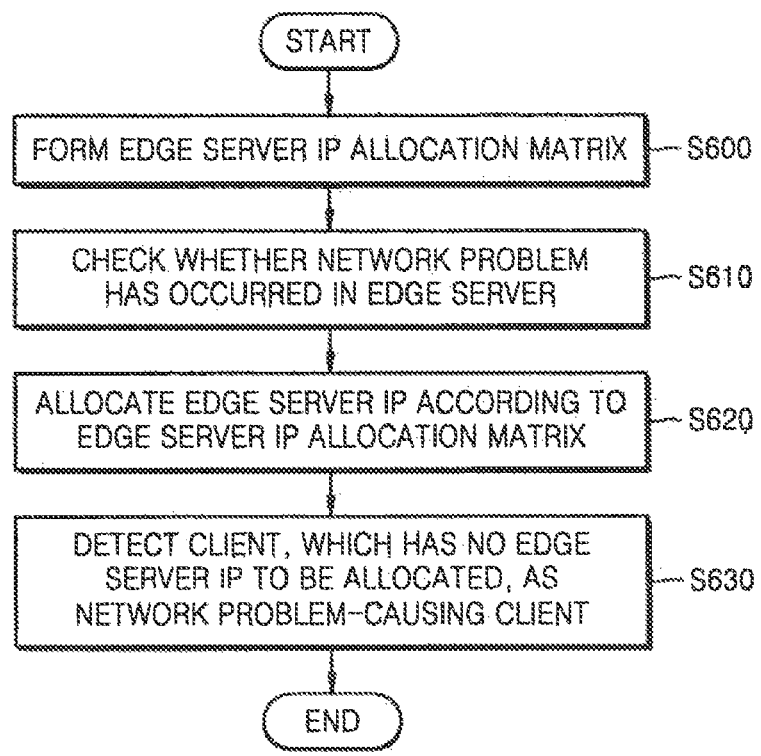
FIG. 6 is a flow diagram illustrating a network problem-causing client detecting method in the network problem-causing client detecting system of FIG. 2 using the client route control server according to the inventive concept.

FIG. 6 is a flow diagram illustrating a network problem-causing client detecting method in the network problem-causing client detecting system of FIG. 2 using the client route control server according to the inventive concept.

Referring to FIGS. 2 and 6, first, the edge server IP allocation matrix 212 may be formed (operation S600). An edge server IP may be allocated differently for each user information or client IP according to the edge server IP allocation matrix 212, and the edge server IP allocation may be performed by at least two-stage edge server IP for each user information or client IP.

The network problem occurrence checking unit 230 may check whether a network problem occurs in the edge server (operation S610).

When it is checked by the network problem occurrence checking unit 230 that a network problem occurs in the edge server, an edge server IP may be allocated to the client using the edge server having the network problem with reference to the edge server IP allocation matrix 212 (operation S620).

In this case, with reference to the edge server IP allocation matrix 212, the network problem-causing client detecting unit 220 may detect user information or a client IP, which has no edge server IP to be allocated, as a network problem-causing client (operation S630).

Figure 3:
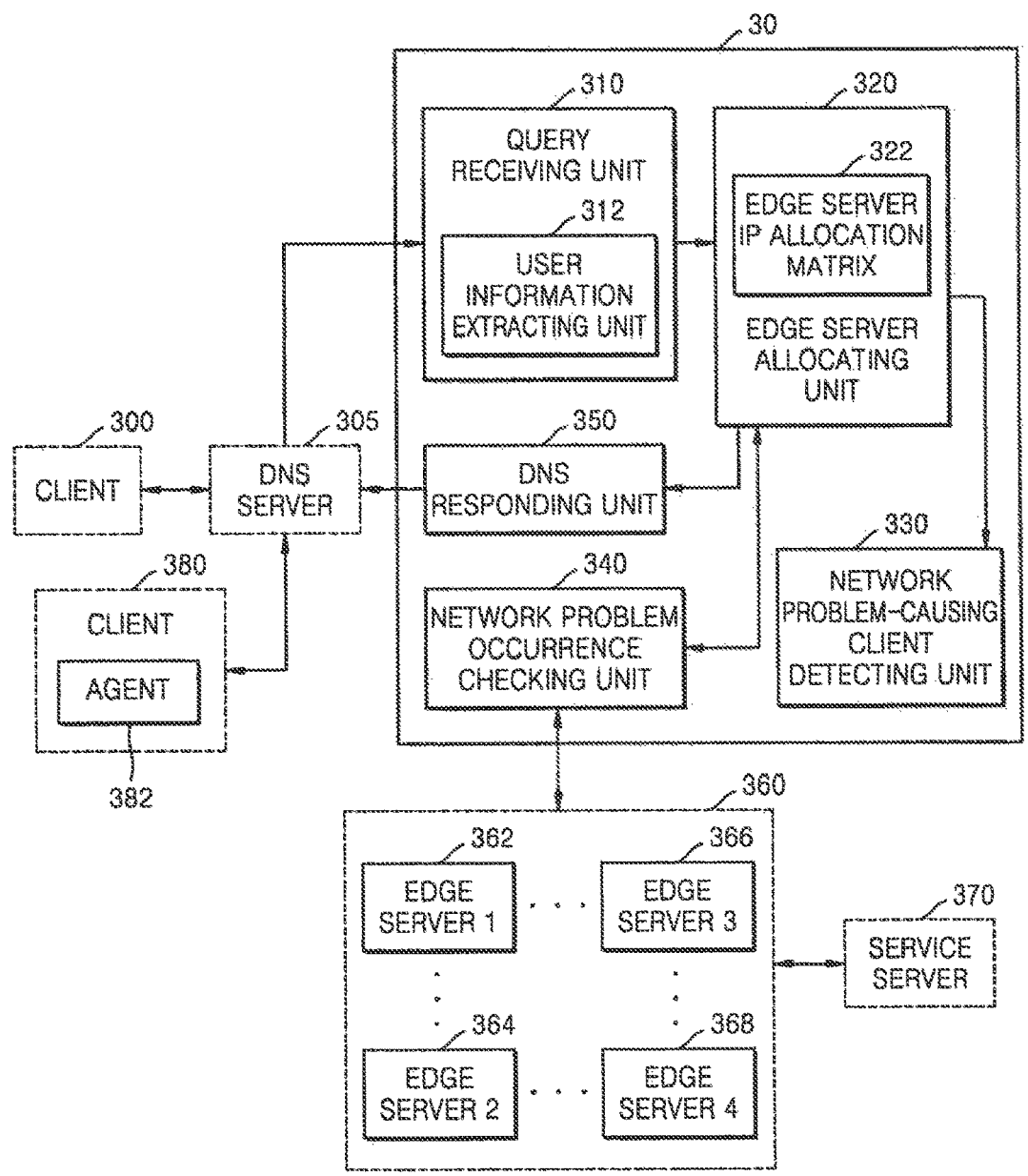
FIG. 3 is a block diagram illustrating a configuration of a first embodiment of a network problem-causing client detecting system using a client route control server according to the inventive concept.

FIG. 3 is a block diagram illustrating a configuration of a first embodiment of a network problem-causing client detecting system using a client route control server according to the inventive concept. Referring to FIG. 3, a first embodiment of a network problem-causing client detecting system 30 using a client route control server according to the inventive concept may include a query receiving unit 310, an edge server allocating unit 320, a network problem-causing client detecting unit 330, a network problem occurrence checking unit 340, and a DNS responding unit 350.

When a DNS server 305 receives a DNS query from the client and transmits the DNS query, the query receiving unit 310 may receive the DNS query. In this case, when user information is included in the DNS query, a user information extracting unit 312 may extract the user information included in the DNS query.

The edge server allocating unit 320 may have an edge server IP allocation matrix 322 and allocate an edge server IP to the client transmitting the DNS query with reference to the edge server IP allocation matrix 322. Herein, an edge server IP may be allocated differently for each user information or client IP according to the edge server IP allocation matrix 322, and the edge server IP allocation may be performed by at least two-stage edge server IP for each user information or client IP.

When the DNS query receiving unit 310 receives the DNS query and the edge server allocating unit 320 allocates the edge server to the client transmitting the DNS query, the network problem occurrence checking unit 340 may check whether a network problem occurs in the allocated edge server.

When a network problem does not occur in the allocated edge server, the DNS responding unit 350 may provide an edge server IP allocated for each user information or client IP in response to the DNS query.

In order to allocate, when a network problem occurs in the edge server, an edge server IP to the client using the edge server having the network problem with reference to the edge server IP allocation matrix 322, the network problem-causing client detecting unit 330 may detect user information or a client IP, which has no edge server IP to be allocated, as a network problem-causing client.

Herein, the edge server may be implemented by a program, a server, and a hardware device having a service relay function or a service function, such as a proxy server or a cache server. The edge server may be used as a service route accessed by the client and may function as a service server accessed by the client.

A service relay network 360 may include an edge server including a hardware device or a server having a service relay function or a service function, and network devices such as a gateway, a router, a switch, and a hub.

Also, in order to re-connect the edge server and the clients connected to the edge server having the network problem, an agent 382 mounted in a client 380 may transmit the DNS query and may transmit a DNS query including user information.

The user information included in the DNS query may include user identification information or device identification information and may include, for example, at least one of Login ID, Device ID (e.g., MAC, CPU ID, or HDD Serial), Phone Number, and IP Address.

Figure 7:
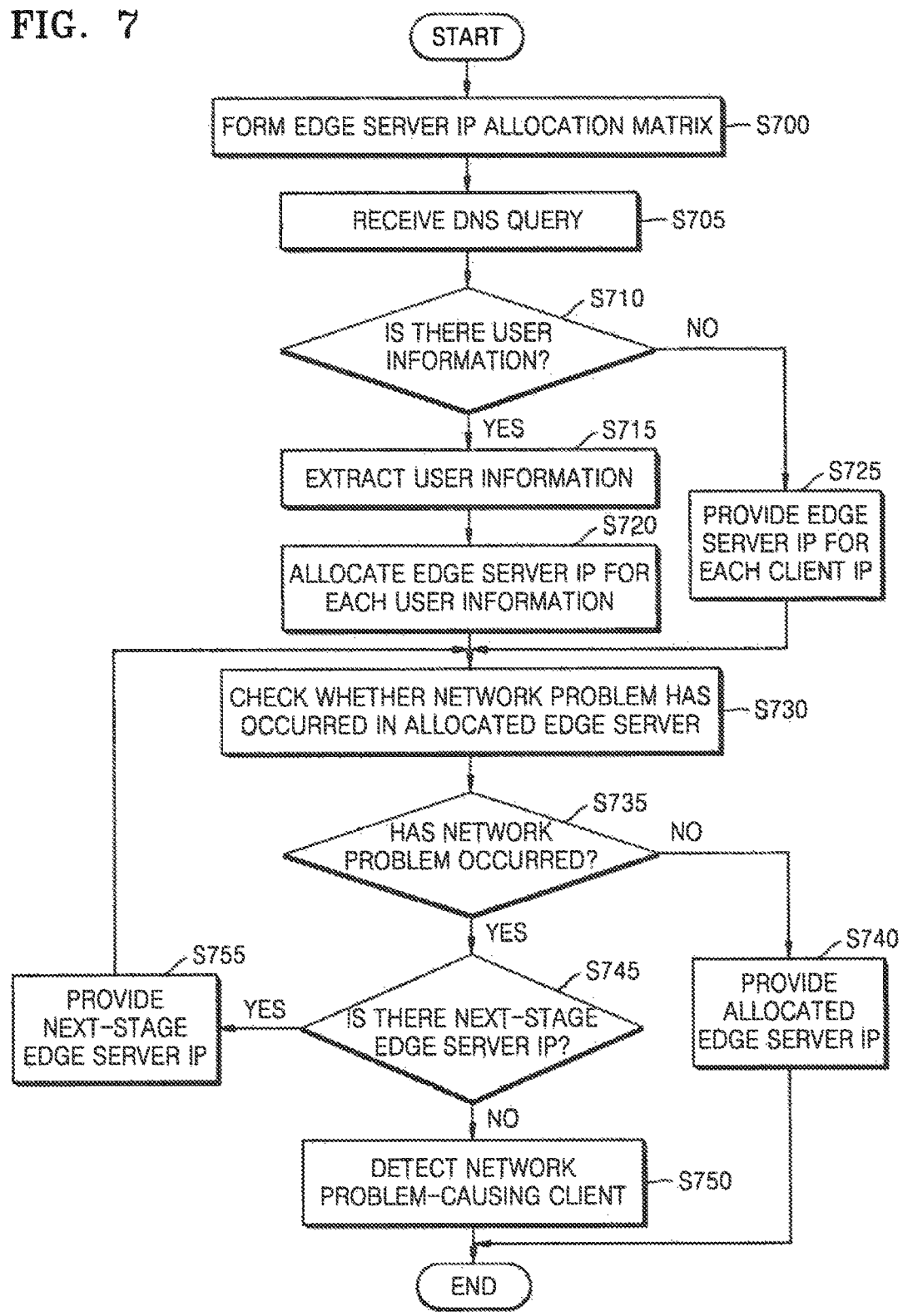
FIG. 7 is a flow diagram illustrating a network problem-causing client detecting method in the first embodiment of the network problem-causing client detecting system of FIG. 3 using the client route control server according to the inventive concept.

FIG. 7 is a flow diagram illustrating a network problem-causing client detecting method in the first embodiment of the network problem-causing client detecting system of FIG. 3 using the client route control server according to the inventive concept.

Referring to FIGS. 3 and 7, first, the edge server IP allocation matrix 322 may be formed (operation S700).

The query receiving unit 310 may receive a DNS query from the DNS server 305 (operation S705).

The user information extracting unit 312 may check whether user information is included in the received DNS query (operation S710).

When user information is included in the received DNS query, the user information may be extracted (operation S715).

The edge server allocating unit 320 may allocate an edge server IP corresponding to the extracted user information with reference to the edge server IP allocation matrix 322 (operation S720).

When user information is not included in the DNS query (in operation S710), the edge server allocating unit 320 may provide the allocated edge server IP to the client transmitting the DNS query with reference to the edge server IP allocation matrix 322 (operation S725).

When the edge server IP is allocated, the network problem occurrence checking unit 340 may check whether a network problem occurs in the allocated edge server (operation S730).

When it is checked by the network problem occurrence checking unit 340 that a network problem does not occur in the allocated edge server, the allocated edge server IP may be provided by the edge server allocating unit 320 (operation S740).

When a network problem occurs in the allocated edge server, whether there is a next-stage edge server IP may be checked with reference to the edge server IP allocation matrix 322 (operation S745). When there is no next-stage edge server IP to be allocated, the relevant client may be detected as a network problem-causing client (operation S750). When there is a next-stage edge server IP to be allocated, the next-stage edge server IP may be provided to the client transmitting the DNS query (operation S755).

Figure 4:
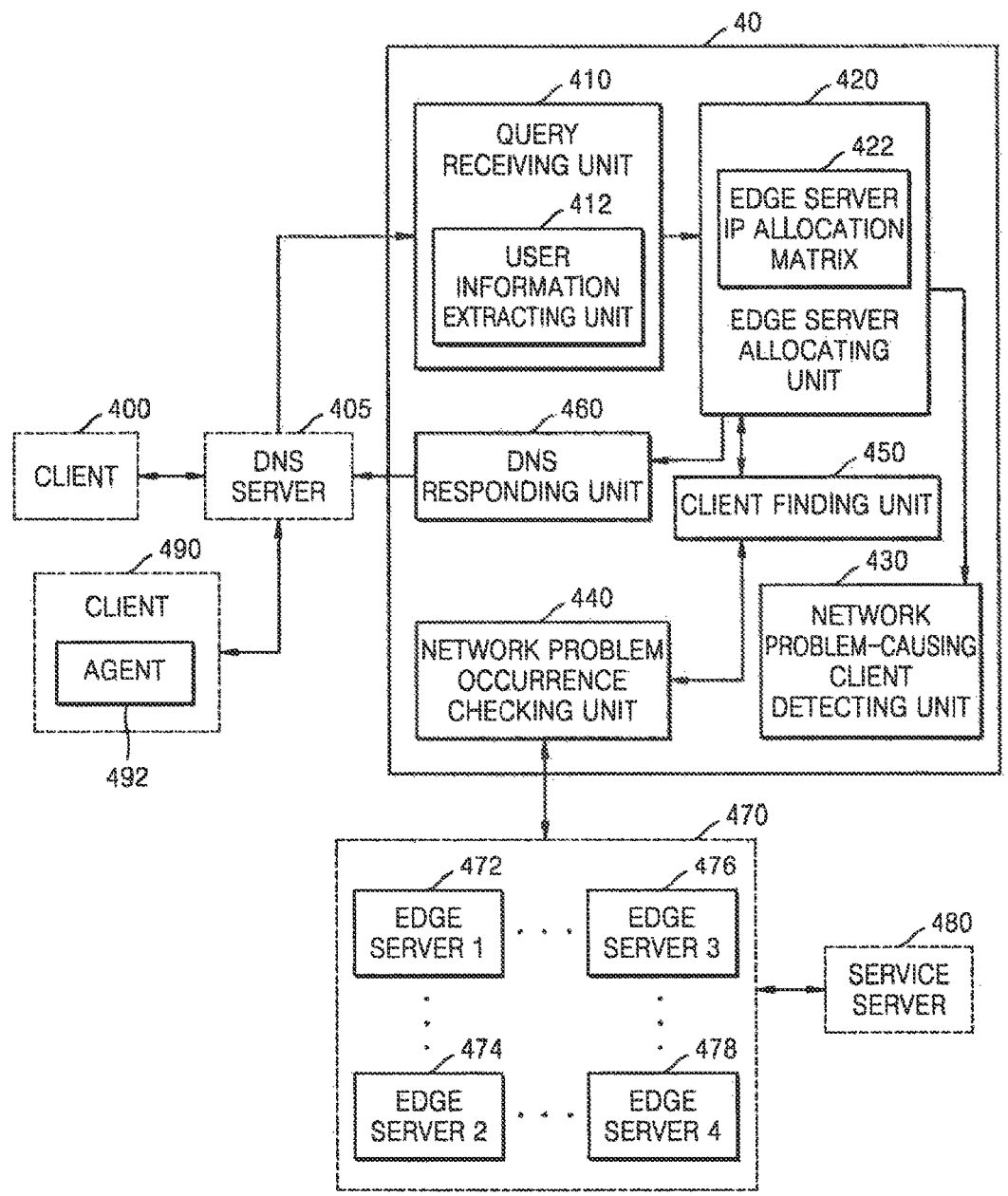
FIG. 4 is a block diagram illustrating a configuration of a second embodiment of a network problem-causing client detecting system using a client route control server according to the inventive concept.

FIG. 4 is a block diagram illustrating a configuration of a second embodiment of a network problem-causing client detecting system using a client route control server according to the inventive concept. Referring to FIG. 4, a second embodiment of a network problem-causing client detecting system 40 using a client route control server according to the inventive concept may include a query receiving unit 410, an edge server allocating unit 420, a network problem-causing client detecting unit 430, a network problem occurrence checking unit 440, a client finding unit 450, and a DNS responding unit 460.

The network problem occurrence checking unit 440 may monitor whether a network problem occurs in an edge server, regardless of DNS query reception.

When an edge server having a network problem is detected through the network problem occurrence checking unit 440, the client finding unit 450 may find a client using the edge server as a connection route to a service server 480.

The edge server allocating unit 420 may have an edge server IP allocation matrix 422 and allocate, when a network problem occurs in the edge server, an edge server IP to the client using the edge server having the network problem with reference to the edge server IP allocation matrix 422. Herein, an edge server IP may be allocated differently for each user information or client IP according to the edge server IP allocation matrix 422, and the edge server IP allocation may be performed by at least two-stage edge server IP for each user information or client IP.

When a DNS server 405 receives a DNS query from the client and transmits the DNS query, the query receiving unit 410 may receive the DNS query. In this case, when user information is included in the DNS query, a user information extracting unit 412 may extract the user information included in the DNS query.

The DNS responding unit 460 may provide an edge server IP allocated for each user information or client IP in response to a DNS query transmitted by the client.

In order to allocate, when a network problem occurs in the edge server, an edge server IP to the client using the edge server having the network problem with reference to the edge server IP allocation matrix 422, the network problem-causing client detecting unit 430 may detect user information or a client IP, which has no edge server IP to be allocated, as a network problem-causing client.

Herein, the edge server may be implemented by a program, a server, and a hardware device having a service relay function or a service function, such as a proxy server or a cache server. The edge server may be used as a service route accessed by the client and may function as a service server accessed by the client.

A service relay network 470 may include an edge server including a hardware device or a server having a service relay function or a service function, and network devices such as a gateway, a router, a switch, and a hub.

Also, in order to re-connect the edge server and the clients connected to the edge server having the network problem, an agent 492 mounted in a client 490 may transmit the DNS query and may also transmit a DNS query including user information.

The user information included in the DNS query may include user identification information or device identification information and may include, for example, at least one of Login ID, Device ID (e.g., MAC, CPU ID, or HDD Serial), Phone Number, and IP Address.

Figure 8:
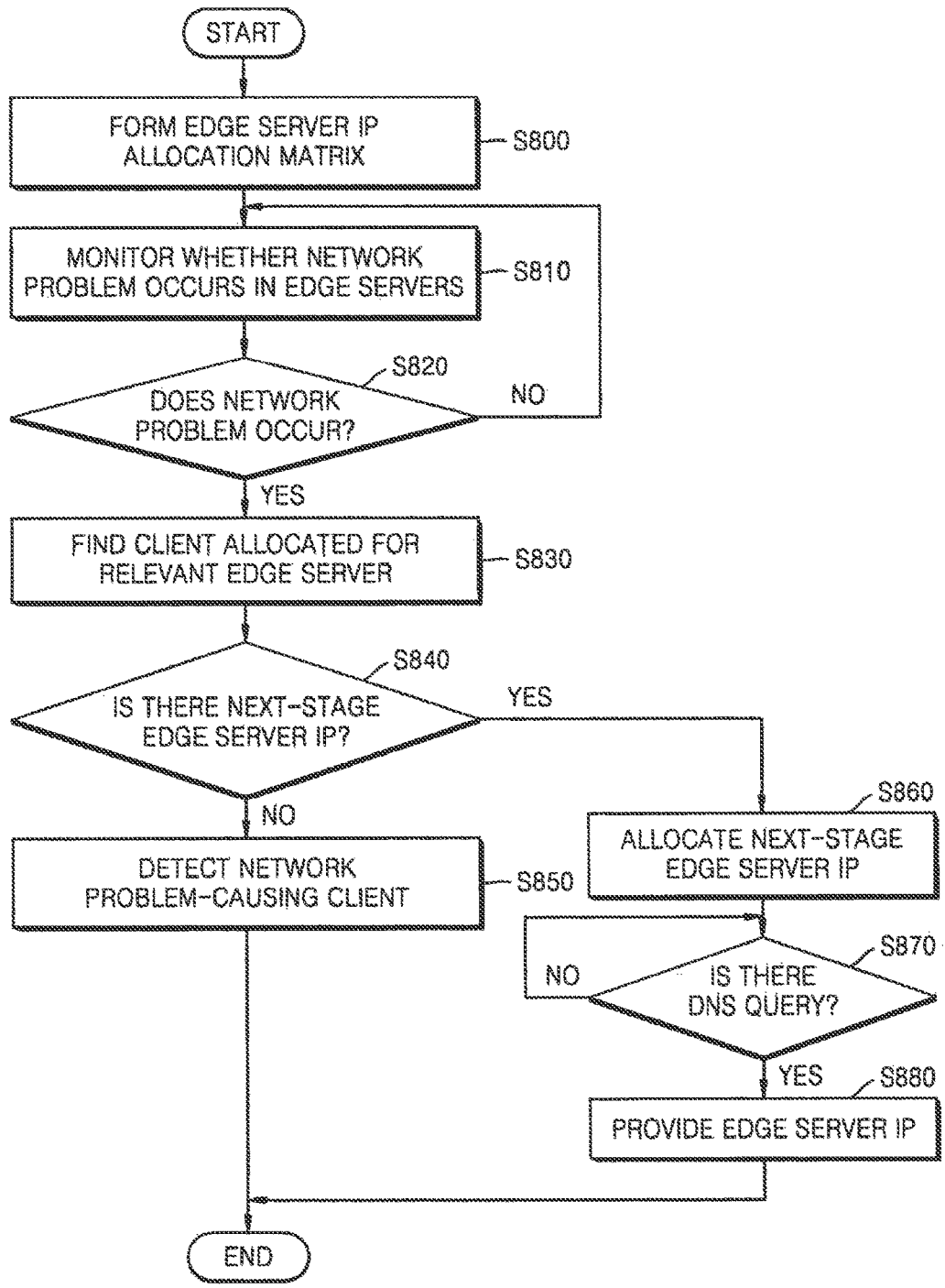
FIG. 8 is a flow diagram illustrating a network problem-causing client detecting method in the second embodiment of the network problem-causing client detecting system of FIG. 4 using the client route control server according to the inventive concept.

FIG. 8 is a flow diagram illustrating a network problem-causing client detecting method in the second embodiment of the network problem-causing client detecting system of FIG. 4 using the client route control server according to the inventive concept.

Referring to FIGS. 4 and 8, first, the edge server IP allocation matrix 422 may be formed (operation S800).

The network problem occurrence checking unit 440 may monitor whether a network problem occurs in an edge server, regardless of DNS query reception (operation S810).

When it is monitored that a network problem occurs in the edge server (operation S820), the client finding unit 450 may find a client using the edge server having the network problem as an access route to the service server 480 (operation S830).

Whether there is a next-stage edge server IP allocated to the found client may be checked (operation S840). When there is no next-stage edge server IP, the network problem-causing client detecting unit 430 may detect the found client as a network problem-causing client (operation S850).

When there is a next-stage edge server IP, the edge server allocating unit 420 may allocate the next-stage edge server IP.

Thereafter, when a DNS query is received from the found client, the DNS responding unit 460 may provide the allocated edge server IP to the client transmitting the DNS query (operation S880).

Figure 5:
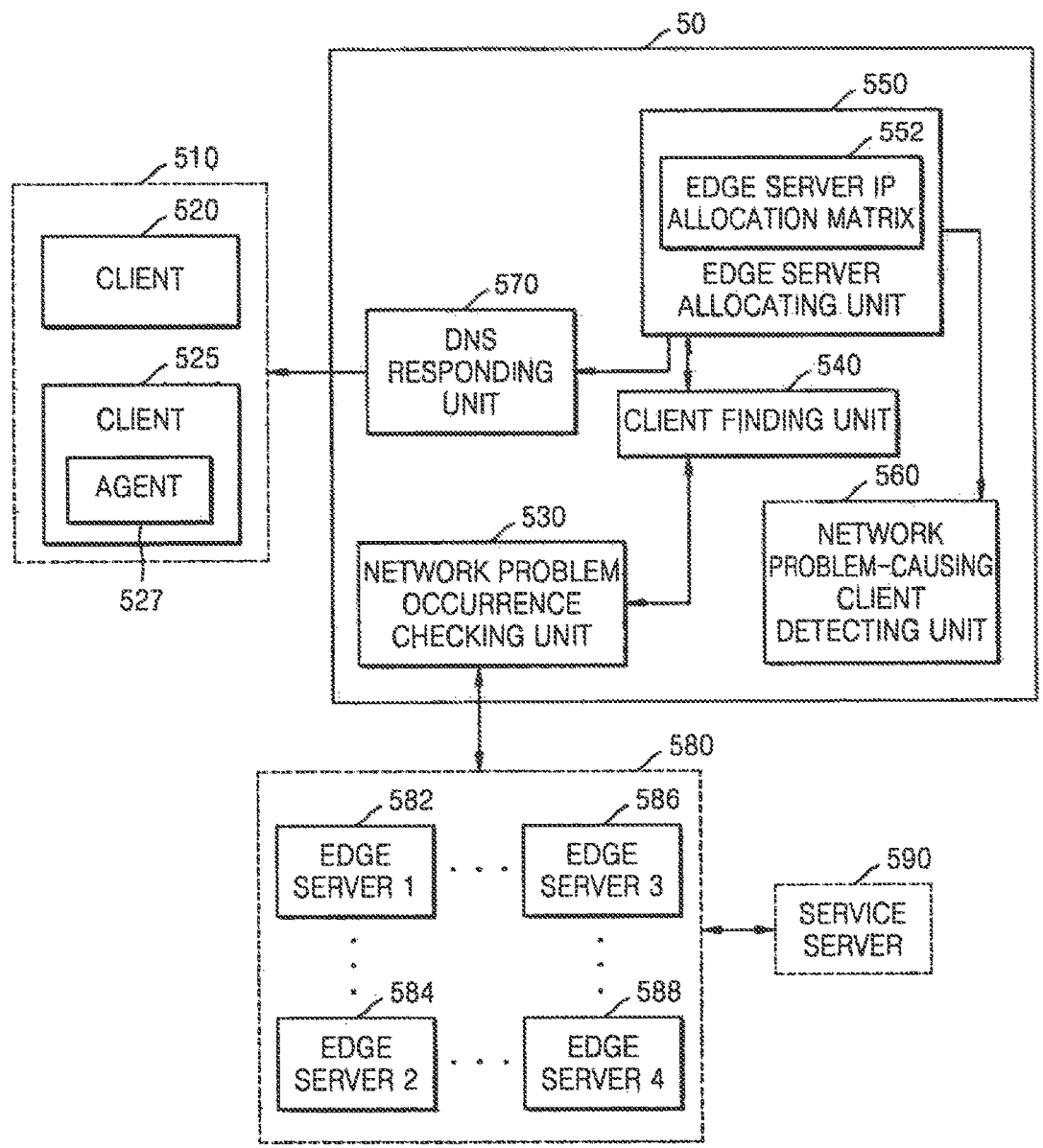
FIG. 5 is a block diagram illustrating a configuration of a third embodiment of a network problem-causing client detecting system using a client route control server according to the inventive concept.

FIG. 5 is a block diagram illustrating a configuration of a third embodiment of a network problem-causing client detecting system using a client route control server according to the inventive concept. Referring to FIG. 5, a third embodiment of a network problem-causing client detecting system 50 using a client route control server according to the inventive concept may include a network problem occurrence checking unit 530, a client finding unit 540, an edge server allocating unit 550, a network problem-causing client detecting unit 560, and a DNS responding unit 570.

The network problem occurrence checking unit 530 may monitor whether a network problem occurs in an edge server, regardless of DNS query reception.

When an edge server having a network problem is detected through the network problem occurrence checking unit 530, the client finding unit 540 may find a client using the edge server as a connection route to a service server 590.

The edge server allocating unit 550 may have an edge server IP allocation matrix 552 and allocate, when a network problem occurs in the edge server, an edge server IP to the client using the edge server having the network problem with reference to the edge server IP allocation matrix 552. Herein, an edge server IP may be allocated differently for each user information or client IP according to the edge server IP allocation matrix 552, and the edge server IP allocation may be performed by at least two-stage edge server IP for each user information or client IP.

Regardless of a DNS query, the DNS responding unit 570 may provide the client with an edge server IP allocated for each user information or client IP allocated through the edge server allocating unit 550.

In order to allocate, when a network problem occurs in the edge server, an edge server IP to the client using the edge server having the network problem with reference to the edge server IP allocation matrix 552, the network problem-causing client detecting unit 560 may detect user information or a client IP, which has no edge server IP to be allocated, as a network problem-causing client.

Herein, the edge server may be implemented by a program, a server, and a hardware device having a service relay function or a service function, such as a proxy server or a cache server. The edge server may be used as a service route accessed by the client and may function as a service server accessed by the client.

A service relay network 580 may include an edge server including a hardware device or a server having a service relay function or a service function, and network devices such as a gateway, a router, a switch, and a hub.

Also, an agent 527 mounted in a client 525 may transmit the DNS query in order to re-connect the edge server and the clients connected to the edge server having the network problem.

Figure 9:
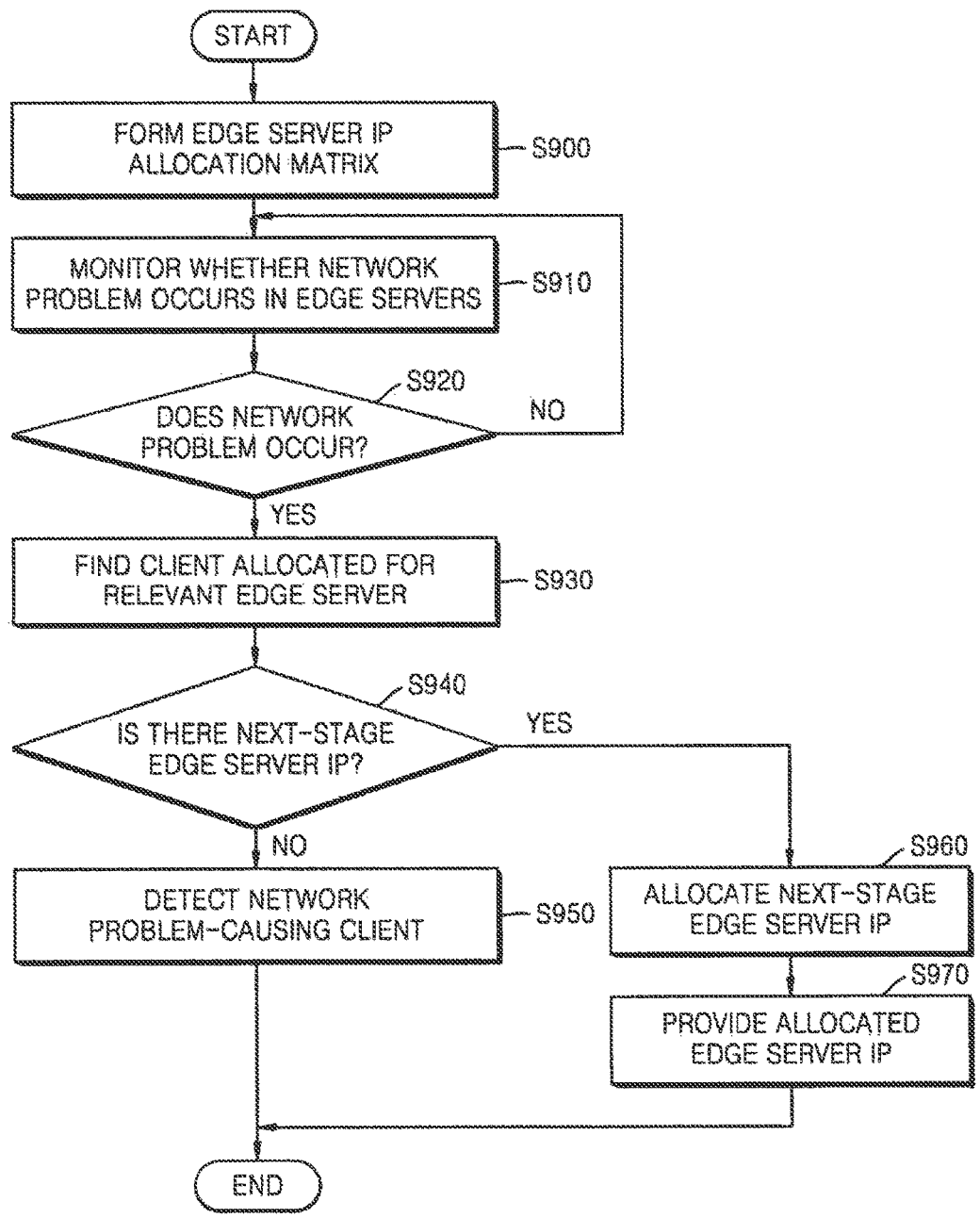
FIG. 9 is a flow diagram illustrating a network problem-causing client detecting method in the third embodiment of the network problem-causing client detecting system of FIG. 5 using the client route control server according to the inventive concept.

FIG. 9 is a flow diagram illustrating a network problem-causing client detecting method in the third embodiment of the network problem-causing client detecting system of FIG. 5 using the client route control server according to the inventive concept.

Referring to FIGS. 5 and 9, first, the edge server IP allocation matrix 552 may be formed (operation S900).

The network problem occurrence checking unit 530 may monitor whether a network problem occurs in an edge server (operation S910).

When it is monitored that a network problem occurs in the edge server (operation S920), the client finding unit 540 may find a client using the edge server having the network problem as an access route to the service server 590 (operation S930).

Whether there is a next-stage edge server IP allocated to the found client may be checked (operation S940). When there is no next-stage edge server IP, the network problem-causing client detecting unit 560 may detect the found client as a network problem-causing client (operation S950).

When there is a next-stage edge server IP, the edge server allocating unit 550 may allocate the next-stage edge server IP (operation S960). Thereafter, regardless of the DNS query reception from the found client, the DNS responding unit 570 may provide the allocated edge server IP to the found client or the agent of the client (operation S970).

Figure 10:
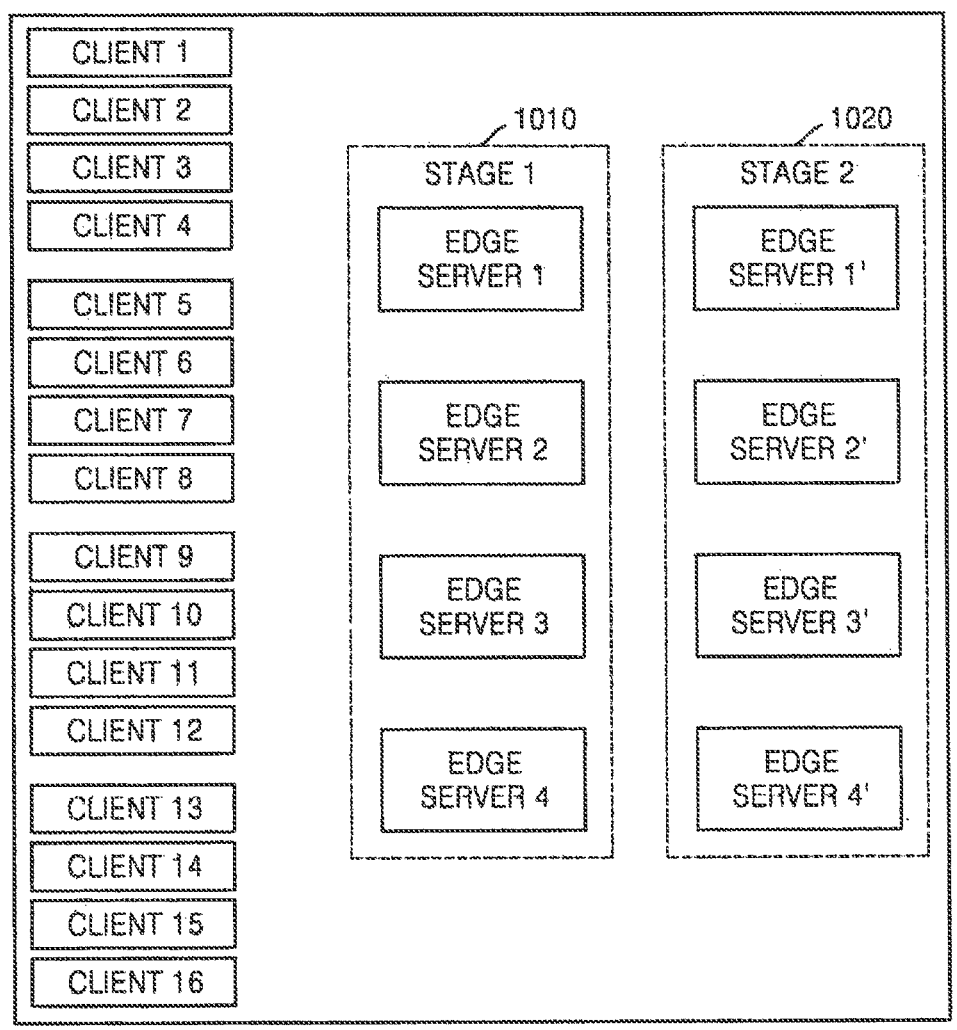
FIG. 10 illustrates an example of the IP of a DDoS attack orderer identifying method using a client route control server according to the inventive concept.

FIG. 10 illustrates an example of a DDoS attack orderer IP identifying method using a client route control server according to the inventive concept.

Referring to FIG. 10, when 16 clients are to access the server, the CRCS may prepare 8 edge servers. The 8 edge servers may be divided by 4 and managed in a first stage (Stage 1) 1010 and a second stage (Stage 2) 1020. The total number of edge servers may vary according to clients, and the number of edge servers and the number of stages may vary according to environments. Also, the number of clients connected to each edge server may vary according to cases.

The client may access the edge server based on the IP provided by the CRCS. In this case, according to the route control algorithm, in preparation for the case where a network problem occurs in the edge server of the first stage (Stage 1) connecting with the client, the CRCS may pre-designate the edge server of the second stage (Stage 2) to be accessed in a reserved manner. When configured in this way, the clients may have routes illustrated in Table 1.

TABLE 1

| Client | Current Stage 1 | Reserved Stage 2 |
| --- | --- | --- |
| Client 1 | Edge Server 1 | Edge Server 1' |
| Client 2 | Edge Server 1 | Edge Server 2' |
| Client 3 | Edge Server 1 | Edge Server 3' |
| Client 4 | Edge Server 1 | Edge Server 4' |
| Client 5 | Edge Server 2 | Edge Server 1' |
| Client 6 | Edge Server 2 | Edge Server 2' |
| Client 7 | Edge Server 2 | Edge Server 3' |
| Client 8 | Edge Server 2 | Edge Server 4' |
| Client 9 | Edge Server 3 | Edge Server 1' |
| Client 10 | Edge Server 3 | Edge Server 2' |
| Client 11 | Edge Server 3 | Edge Server 3' |
| Client 12 | Edge Server 3 | Edge Server 4' |
| Client 13 | Edge Server 4 | Edge Server 1' |
| Client 14 | Edge Server 4 | Edge Server 2' |

TABLE 1-continued

| Client | Current Stage 1 | Reserved Stage 2 |
|---|---|---|
| Client 15 | Edge Server 4 | Edge Server 3' |
| Client 16 | Edge Server 4 | Edge Server 4' |

Referring to Table 1, the clients 1 to 4 may connect with the server through the edge server 1 of the first stage. The clients 5 to 8 may connect with the server through the edge server 2 of the first stage. The clients 9 to 12 may connect with the server through the edge server 3 of the first stage. The clients 13 to 16 may connect with the server through the edge server 4 of the first stage. When a network problem occurs in any one of the edge servers 1 to 4, the clients using the edge server having the network problem may connect with the edge servers 1' to 4' of the second stage. For example, when a network problem occurs in the edge server 2, the clients using the edge server 2 as the edge server of the first stage may be found. The clients 5 to 8 may be found as the clients using the edge server 2 as the edge server of the first stage. Then, the clients 5 to 8 may connect with the edge servers of the second stage. Thus, the client 5 may connect with the edge server 1' of the second stage, the client 6 may connect with the edge server 2' of the second stage, the client 7 may connect with the edge server 3' of the second stage, and the client 8 may connect with the edge server 4' of the second stage. Thereafter, when a network problem occurs in the edge server 4', the client 8 may be identified as the client making a DDoS attack.

In this manner, when having the route illustrated in Table 1, one client may have only one route by being designated for the edge servers of the first stage and the second stage. That is, each client may have a unique route.

Figure 11:
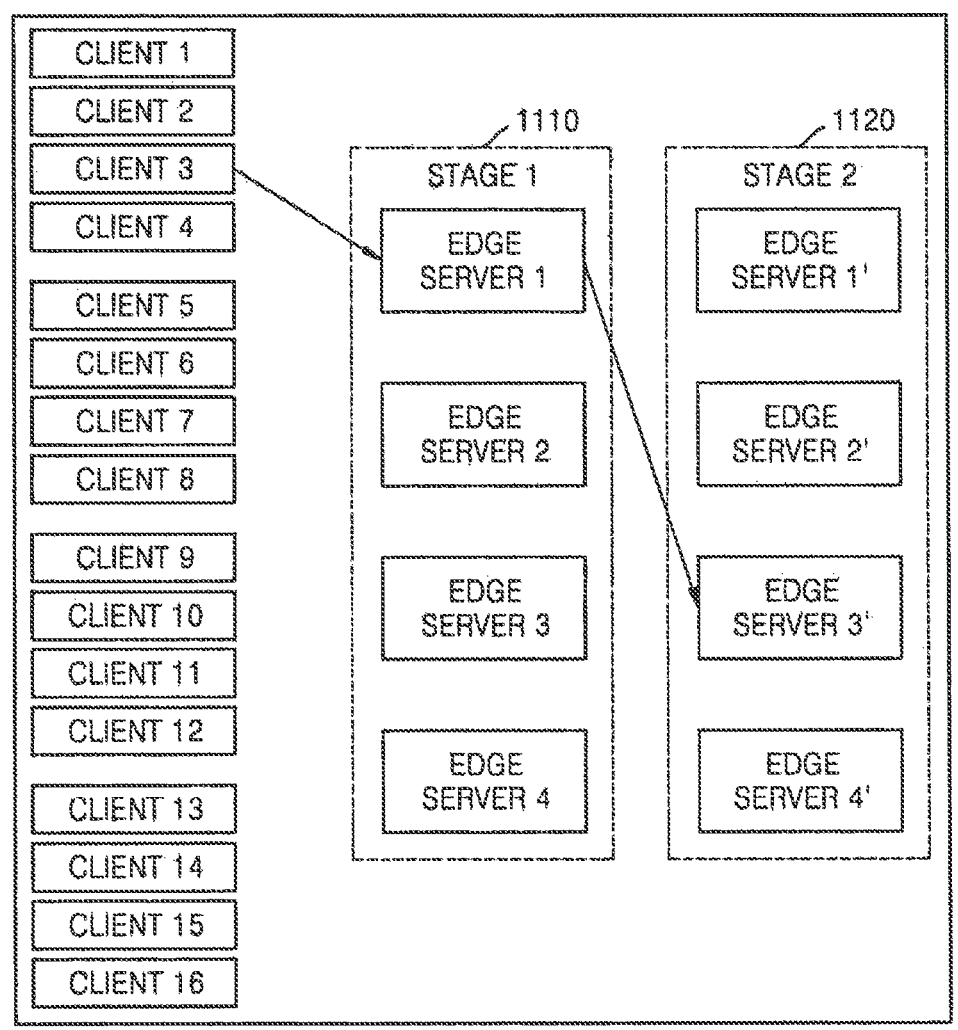
FIG. 11 illustrates that Edge Server 1 and Edge Server 3' are designated respectively in Stage 1 and Stage 2 as a unique route in a case where Client 3 is a DDoS attack orderer.

In this manner, by pre-designating the edge server for each client, the client causing the network problem may be easily found. For example, referring to Table 1, the edge server 1 and the edge server 3' may be respectively designated as the edge servers for the client 3 in the first stage (1110) and the second stage (1120) in a case where the client 3 is a DDoS attack orderer as illustrated in FIG. 11. When a network problem occurs in the edge server 1, the clients 1, 2, 3, and 4 may be found as the clients using the edge server 1 as the edge server of the first stage (1110). For example, according to the method of the inventive concept, the found clients 1, 2, 3, and 4 may be respectively connected to the edge servers of the second stage (1120), and the CRCS may connect each of the clients to the reserved edge server designated as Table 1, that is, the edge server of the second stage. That is, the client 1 may connect with the edge server 1' of the second stage, the client 2 may connect with the edge server 2' of the second stage, the client 3 may connect with the edge server 3' of the second stage, and the client 4 may connect with the edge server 4' of the second stage.

If the client reattempts an attack on the edge server 3' even after being connected to the designated edge server, since only the client 3 is connected to the edge server 3', when a network problem occurs in the edge server 3', the client 3 may be immediately identified as the DDoS attack orderer. Table 2 illustrates this process in brief

TABLE 2

| Client | Stage 1 | Stage 2 |
|---|---|---|
| Client 1 | Edge Server 1 | Edge Server 1' |
| Client 2 | Edge Server 1 | Edge Server 2' |

TABLE 2-continued

| Client | Stage 1 | Stage 2 |
|---|---|---|
| Client 3 | Edge Server 1 | Edge Server 3' |
| Client 4 | Edge Server 1 | Edge Server 4' |

According to this principle, 8 edge servers may accommodate 16 clients. Also, the service may be continuously maintained (except the attack orderer) even when a DDoS attack occurs, and the same is true even when the number of stages of edge servers or the number of clients increases.

Figure 12:
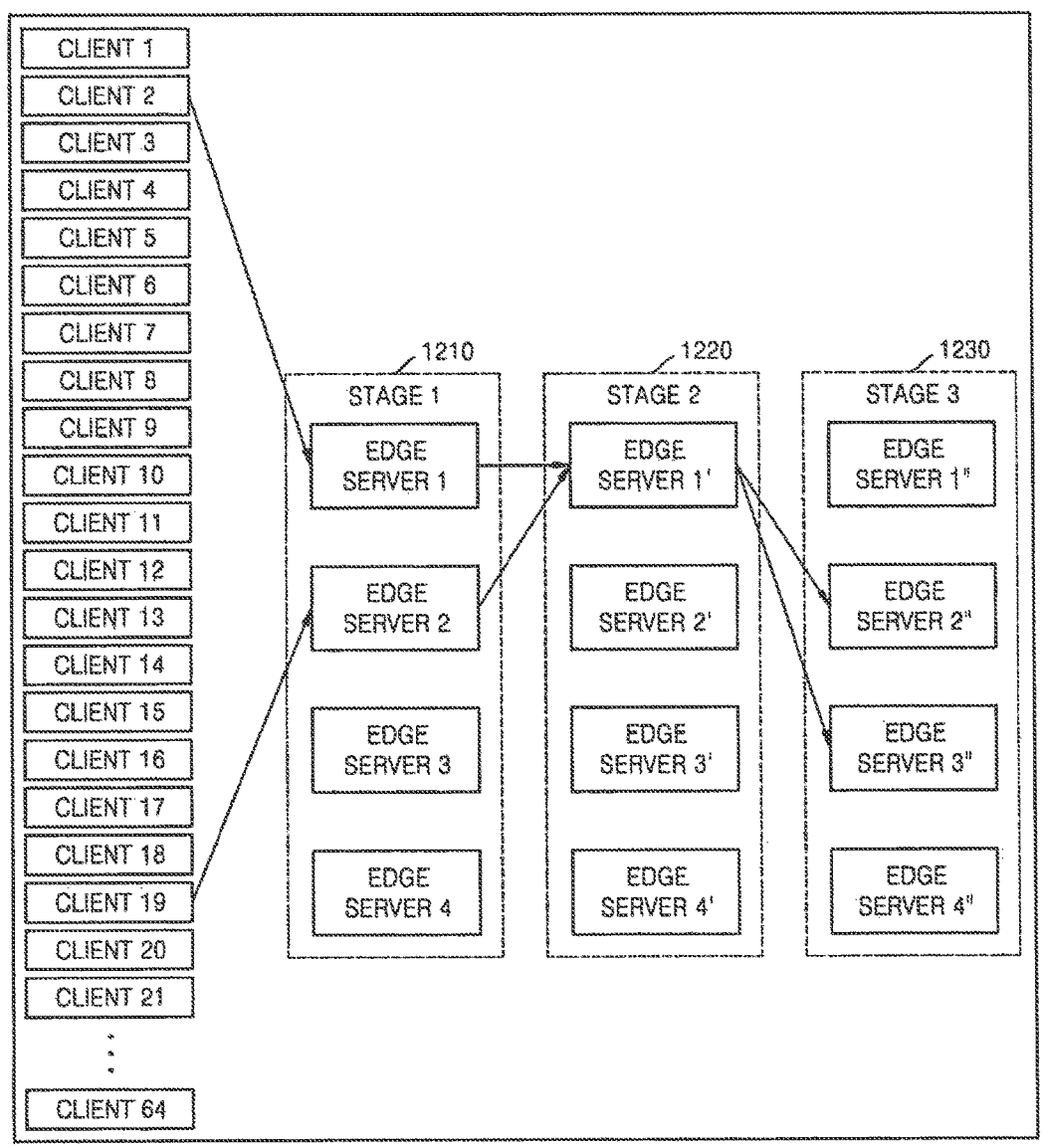
FIGS. 12 and 13 illustrate that a client has only one route according to a route control algorithm even when the number of stages of edge servers or the number of edge servers in each stage increases.
Figure 13:
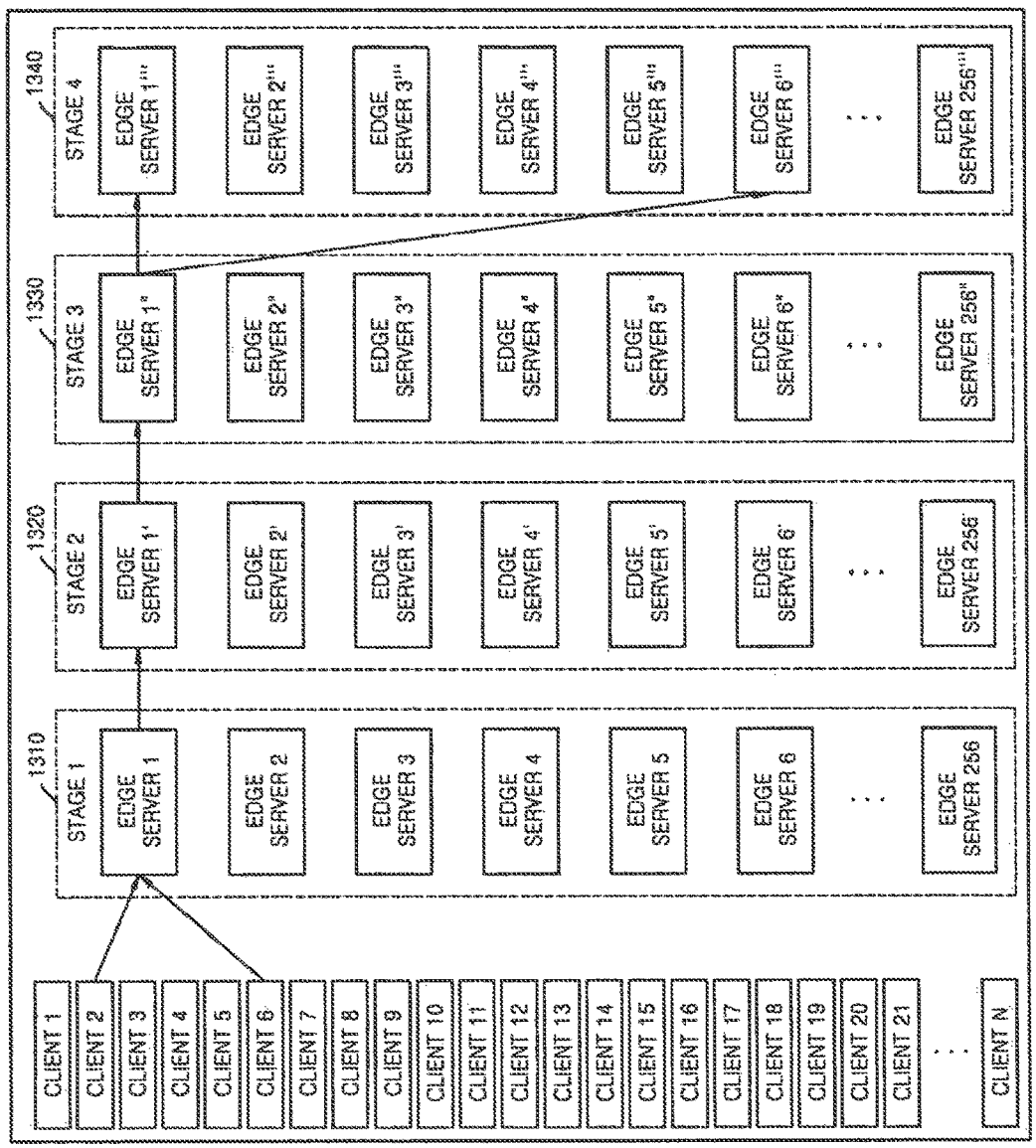

As illustrated in FIG. 12 or 13, since the client has only one route according to the route control algorithm even when the number of stages of edge servers or the number of edge servers in each stage increases, the attack orderer IP may be identified.

TABLE 3

| Client | Stage 1 | Stage 2 | Stage 3 |
|---|---|---|---|
| Client 1 | Edge Server 1 | Edge Server 1' | Edge Server 1" |
| Client 2 | Edge Server 1 | Edge Server 1' | Edge Server 2" |
| Client 3 | Edge Server 1 | Edge Server 1' | Edge Server 3" |
| Client 4 | Edge Server 1 | Edge Server 1' | Edge Server 4" |
| Client 5 | Edge Server 1 | Edge Server 2' | Edge Server 1" |
| Client 6 | Edge Server 1 | Edge Server 2' | Edge Server 2" |
| Client 7 | Edge Server 1 | Edge Server 2' | Edge Server 3" |
| Client 8 | Edge Server 1 | Edge Server 2' | Edge Server 4" |
| Client 9 | Edge Server 1 | Edge Server 3' | Edge Server 1" |
| Client 10 | Edge Server 1 | Edge Server 3' | Edge Server 2" |
| . | . | . | . |
| Client 19 | Edge Server 2 | Edge Server 1' | Edge Server 3" |
| . | . | . | . |
| Client 64 | Edge Server 4 | Edge Server 4' | Edge Server 4" |

For example, referring to Table 3, as illustrated in FIG. 12, when the client 2 and the client 19 are DDoS attack orderers, the clients 2 and 19 may be designated to the edge server 1 and the edge server 2 in the first stage (1210), may be designated to the edge server 1' in the second stage (1220), and may be designated to the edge server 2" and the edge server 3" in the third stage (1230).

Thus, for example, when a network problem occurs in the edge server 1 of the first stage (1210), the clients using the edge server 1 as the edge server of the first stage (1210) may be found. In this case, referring to Table 3, the clients 1 to 16 may be found as the clients using the edge server 1 as the edge server of the first stage (1210). According to the method of the inventive concept, as for the found clients 1 to 16, in the second stage (1220), the clients 1 to 4 may use the edge server 1', the clients 5 to 8 may use the edge server 2', the clients 9 to 12 may use the edge server 3', and the clients 13 to 16 may use the edge server 4'.

When a network problem occurs in the edge server 1' of the second stage (1210), the clients using the edge server 1' as the edge server of the second stage (1220) may be found. In this case, referring to Table 3, the clients 1 to 4 may be found as the clients using the edge server 1' as the edge server of the second stage (1210). According to the method of the inventive concept, as for the found clients 1 to 4, in the third stage (1230), the client 1 may use the edge server 1", the client 2 may use the edge server 2", the client 3 may use the edge server 3", and the client 4 may use the edge server 4".

When a network problem occurs in the edge server 2" of the third stage, the client 2 may be the client using the edge server 2" as the edge server of the third stage. Thus, the client 2 may be identified as the client that has caused a network problem in the edge server 1, the edge server 1', and the edge server 2". That is, the client 2 may be immediately identified as the DDoS attack orderer. Table 3 illustrates this process in brief.

Likewise, since the client 19 uses the edge server 2 of the second stage (1210), the edge server 1' of the second stage (1220), and the edge server 3" of the third stage (1230) on a stage-by-stage basis, when a network problem occurs sequentially in the edge server 2 of the second stage (1210), the edge server 1' of the second stage (1220), and the edge server 3" of the third stage (1230), the client 19 may be immediately identified as the client that has caused the network problem. That is, the client 19 may be immediately identified as the DDoS attack orderer. Table 3 illustrates this process in brief.

TABLE 4

| Client | Stage 1 | Stage 2 | Stage 3 | Stage 4 |
| --- | --- | --- | --- | --- |
| Client 1 | Edge Server 1 | Edge Server 1' | Edge Server 1" | Edge Server 1''' |
| Client 2 | Edge Server 1 | Edge Server 1' | Edge Server 1" | Edge Server 2''' |
| Client 3 | Edge Server 1 | Edge Server 1' | Edge Server 1" | Edge Server 3''' |
| Client 4 | Edge Server 1 | Edge Server 1' | Edge Server 1" | Edge Server 4''' |
| Client 5 | Edge Server 1 | Edge Server 1' | Edge Server 1" | Edge Server 5''' |
| Client 6 | Edge Server 1 | Edge Server 1' | Edge Server 1" | Edge Server 6''' |
| Client 7 | Edge Server 1 | Edge Server 1' | Edge Server 1" | Edge Server 7''' |
| Client 8 | Edge Server 1 | Edge Server 1' | Edge Server 1" | Edge Server 8''' |
| Client 9 | Edge Server 1 | Edge Server 1' | Edge Server 1" | Edge Server 9''' |
| . | . | . | . | . |
| . | . | . | . | . |
| . | . | . | . | . |
| Client n | Edge Server 256 | Edge Server 256' | Edge Server 256" | Edge Server 256''' |

According to another embodiment of the inventive concept, when there are 16 clients, the unique route may be pre-allocated as illustrated in Table 1; and when the client 1 transmits a DNS query, the edge server 1 may be allocated in the first stage and the edge server 1' may be allocated in the second stage so that the edge server IPs of the first stage and the second stage may be transmitted to the client and the client may use the edge server 1 of the first stage and the edge server 1' of the second stage. In this manner, as illustrated in Table 1, when all clients are set to use all edge servers of the first stage and the second stage, the clients causing the network problem may be immediately identified without the need to re-connect the next-stage edge server with respect to the edge server having the network problem.

For example, referring to Table 1, when a network problem occurs in the edge server 2 of the first stage and the edge server 4' of the second stage, the client 8 may be immediately identified as the client causing the network problem.

Even in the case of having the third stage and/or the fourth stage as illustrated in FIGS. 12 and 13, if edge servers are allocated according to the algorithm of Tables 3 and 4, when edge servers having a network problem is checked in each stage, the client causing the network problem may be immediately identified with reference to Tables 3 and 4.

Figure 14:
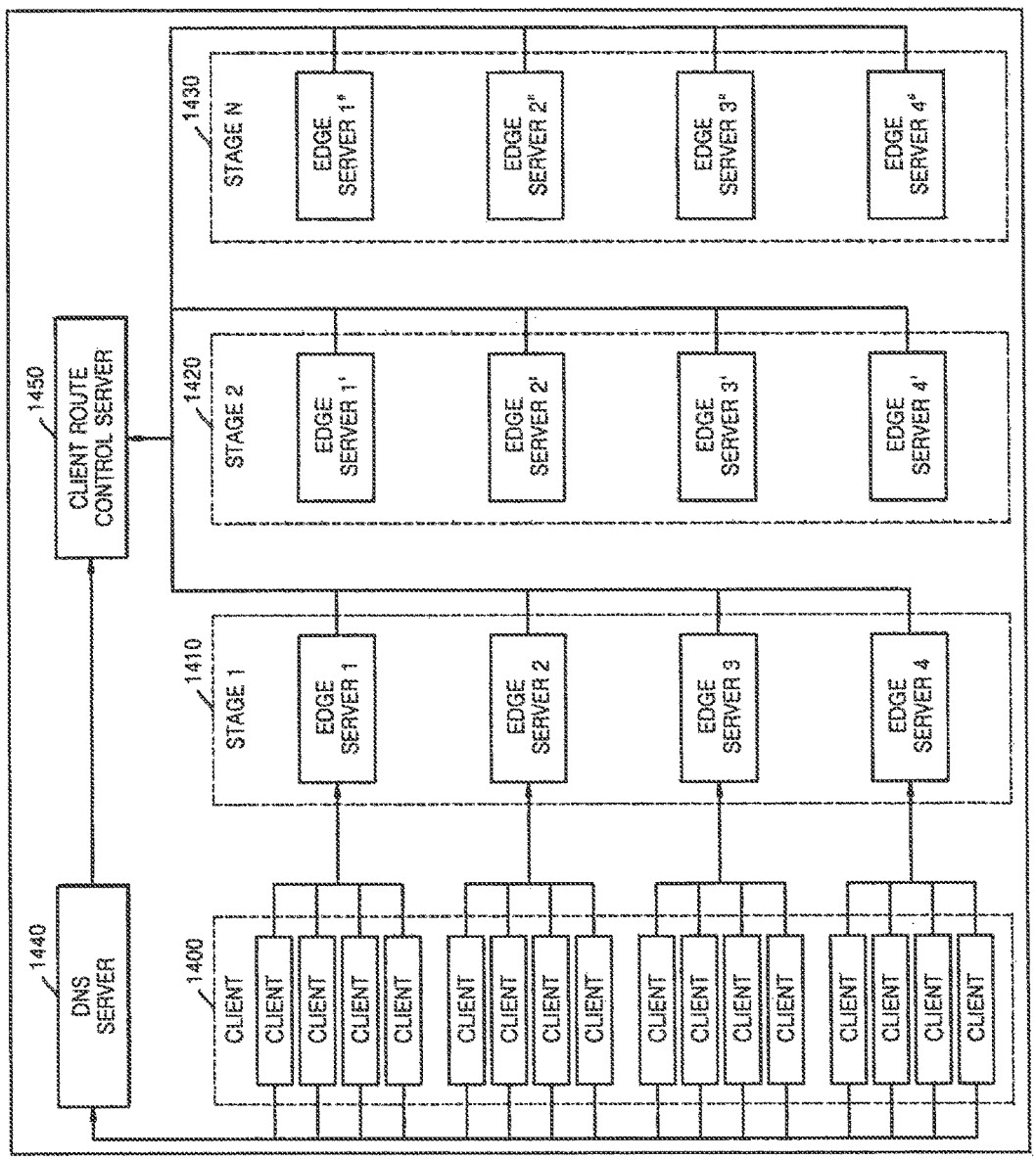
FIG. 14 illustrates an overall flow in which edge servers are designated for a client.

FIG. 14 illustrates an overall flow in which edge servers are designated for a client. When a DNS query is received from a client 1400, a DNS server 1440 may request a response of a client route control server 1450 with respect to the DNS query and the client route control server 1450 may provide an edge server IP to the client transmitting the DNS query. Only the IP of the edge server belonging to the first stage (1410) may be provided in the edge server allocation algorithm according to the first embodiment, while all the IPs of the edge servers belonging to all the stages (i.e., the first stage (1410), the second stage (1420), and the third stage (1430)) may be provided in the edge server allocation algorithm according to the second embodiment.

Through the provided IPs of the edge servers, the client 1400 may access a service server (not illustrated) through the edge servers to receive a service.

The above IP of DDoS attack orderer identifying method and system using the client route control server according to the inventive concept may have the following features.

First, a unique route may be allocated to each client. Since a network device such as a bridge or a router is used to rapidly and safely transmit a packet, many lines may be connected thereto. Thus, when a network problem occurs in some lines, the packet may be re-transmitted to other lines to provide a smooth service. Therefore, packet communication may be stably maintained on the network infra.

However, since the client uses several lines, when the client is a DDoS attack orderer, the number of cases of determining the client as the attack orderer may increase. That is, the range of determining the client as the DDoS attack orderer may become too broad.

In the route designation algorithm of the inventive concept, due to the edge servers classified stage by stage and the unique route set by the CRCS, a unique route may occur for the client as illustrated in Tables 1, 3, and 4.

Second, the IP of the DDoS attack orderer may be found by using the unique route. In preparation for the case where a network problem occurs in a line, a general network may be provided with several reserved lines to prevent the disconnection of communication. In the case of a DDoS attack orderer, due to the number of cases caused by many lines, an IP of attack orderer may not be determined.

However, according to the inventive concept, since a unique route may be allocated to each client and the client may be managed by the CRCS, the line to be accessed by the client may be fixed. Thus, when a DDoS attack occurs on a line, since the line may necessarily be used by one client, the client causing a network problem may be determined as an IP of a DDoS attack orderer and it may be immediately treated.

Third, an edge server may be provided therein. A device such as a bridge or a router functioning as a bridge in a network may connect a client and a server. However, when a client passes through a router or a bridge, the client may move through numerous routes. Even when only one route is provided by a router or a bridge, a huge cost may be required for configuration as in the current network, due to the device characteristics. According to the inventive concept, the edge server may conceal the existence of the server and may function as the route that may be connected by the client.

Fourth, a client route control server (CRCS) may be provided therein. The CRCS may designate an IP corresponding to a domain name and may also manage the information of the client and the edge server. A DNS server or a monitoring server may be provided as a server that performs the same function as the CRCS.

However, a general DNS server may only designate a domain name and an IP. Also, in order not to burden a name server, a designated domain name address may be left in the server for about three hours to about one week or more. This may not burden the server. However, since the system implemented according to the inventive concept should immediately change the domain name and the edge server IP to be designated according to the situation, the DNS system may not satisfy the functions of the inventive concept.

Also, since the monitoring server may only find the state of a monitoring device and calculate the information thereof, it may not properly satisfy the functions of the inventive concept.

Thus, a separate client route control server including a function for implementing the inventive concept may be required.

Fifth, the DNS may be used to transmit the edge server IP to the client. The CRCS may designate the edge server IP corresponding to the domain name to the client, but may not directly transmit the same to the client. Thus, the designated information may be separately transmitted to the DNS so that the client may know the edge server IP.

The inventive concept may also be embodied as computer (any device having an information processing function)-readable codes on a computer-readable recording medium. The computer-readable recording medium may include any data storage device that may store data which may be thereafter read by a computer system. Examples of the computer-readable recording medium may include read-only memories (ROMs), random-access memories (RAMs), compact disk read-only memories (CD-ROMs), magnetic tapes, floppy disks, and optical data storage devices.

Although the inventive concept has been described with reference to the embodiments illustrated in the drawings, this is merely an example and those of ordinary skill in the art will understand that various modifications and other equivalent embodiments may be derived therefrom. Thus, the spirit and scope of the inventive concept should be defined by the appended claims.

The inventive concept may be used in any system for securing the continuity of a service provided to a client, and may also be used particularly to defend against various types of DDoS attacks.

The invention claimed is:

1. A method for detecting a network problem-causing client among non-problem-causing clients by using a client route control system, the method comprising:
    forming an edge server Internet Protocol (IP) allocation matrix that contains at least two alternative edge server IP addresses, the at least two alternative edge server IP addresses are configured to allow an edge server in which a network problem has occurred to be replaced, the alternative edge server IP addresses are different from each other, the at least two alternative edge server IP addresses are allocated for each client, an order of providing the at least two alternative edge server IP addresses for each client is predetermined, and the ordered at least two alternative edge server IP addresses are one-to-one matched to each client, wherein paths used by the network problem-causing client and the non-problem-causing clients to access a service server each contain an edge server;
    checking the network problem occurrence in the edge server;
    allocating an one of the at least two alternative edge server IP addresses according to the edge server IP allocation matrix when the network problem occurs in the edge server; and
    detecting user information or a client IP address, which has no alternative edge server IP address to be allocated according to the edge server IP allocation matrix, as the network problem-causing client,
    wherein the allocation of the one of the at least two alternative edge server IP addresses being performed by at least two-stage alternative edge server IP addresses for each user information or client IP address, in preparation for a case where a network problem occurs in an alternative edge server of a first stage connecting with a client, an alternative edge server of a second stage is pre-designated to be accessed in a reserved manner in such a way that the client has a unique route of edge servers.

2. The method of claim 1, wherein the network problem occurrence check is performed when a domain name server (DNS) query is received from the client.

3. The method of claim 1, wherein the network problem occurrence check is performed regardless of a DNS query from the client.

4. The method of claim 3, wherein when the network problem occurs in the edge server, user information or a client IP address using the edge server having the network problem is found and an edge server IP address allocated for the found user information or client IP is provided to the client.

5. The method of claim 1, wherein the client includes an agent that transmits a DNS query in order to re-connect with another edge server allocated according to the edge server IP allocation matrix when the network problem occurs in the edge server.

6. The method of claim 5, wherein the agent transmits the DNS query including user information.

7. The method of claim 6, wherein when the DNS query is received from the agent of the client, the user information is extracted from the DNS query of the client and an edge server IP address corresponding to the extracted user information is allocated to the client according to the edge server IP allocation matrix.

8. A system for detecting a network problem-causing client among non-problem-causing clients by using a client mute control system, the system comprising:
    an edge server Internet Protocol (IP) allocation matrix of a client route control server, wherein the edge server IP allocation matrix contains at least two alternative edge server IP addresses, the at least two alternative edge server IP addresses are configured to allow an edge server in which a network problem has occurred to be replaced, the alternative edge server IP addresses are different from each other, the at least two alternative edge server IP addresses are allocated for each client, an order of providing the at least two alternative edge server IP addresses for each client is predetermined, and the ordered at least two alternative edge server IP addresses are one-to-one matched to each client, wherein paths used by the network problem-causing client and the non-problem-causing clients to access a service server each contain an edge server;

the client route control server comprises a processor and a memory, the processor is configured to perform a plurality of functions, including:

a network problem occurrence checking function that checks the network problem occurrence in the edge server;

an edge server allocating function that uses the edge server IP allocation matrix and allocates one of the at least two alternative edge server IP addresses according to the edge server IP allocation matrix when the network problem occurs in the edge server;

a domain name server (DNS) responding function that provides the one of the at least two alternative edge server IP addresses for each user information or client IP address in response to a DNS query transmitted by a client; and a network problem-causing client detecting function that detects user information or a client IP address, which has no edge server IP address to be allocated according to the edge server IP allocation matrix, as the network problem-causing client, wherein the allocation of the one of the at least two alternative edge server IP addresses being performed by at least two-stage alternative edge server IP addresses for each user information or client IP address, in preparation for a case where a network problem occurs in an alternative edge server of a first stage connecting with the client, an alternative edge server of a second stage is pre-designated to be accessed in a reserved manner in such a way that the client has a unique route of edge servers.

9. The system of claim 8, wherein the network problem occurrence checking function checks, when the one of the at least two alternative edge server IP addresses is allocated by the edge server allocating function in response to the DNS query, whether there is a network problem in an allocated one of the edge servers corresponding to the allocated one of the at least two alternative edge server IP addresses and the DNS responding function provides the allocated one of the at least two alternative edge server IP addresses to the client through a DNS when there is no network problem in the allocated one of the edge servers corresponding to the allocated one of the at least two alternative edge server IP addresses.

10. The system of claim 8, wherein the network problem occurrence checking function monitors the network problem in the edge server regardless of the DNS query;

the network problem-causing client detecting function includes a client finding function that, when the network problem occurs in the edge server, finds user information or a client IP using the edge server having the network problem;

the edge server allocating function allocates one of the at least two alternative edge server IP addresses corresponding to the found user information or client IP address according to the edge server IP allocation matrix;

and the DNS responding function provides the one of the at least two alternative edge server IP addresses allocated for the found user information or client IP address to the client through a DNS when the DNS query is transmitted by the client corresponding to the found user information or client IP address.

11. The system of claim 8, wherein the network problem occurrence checking function monitors the network problem in the edge server regardless of the DNS query;

the network problem-causing client detecting function includes a client finding function that, when the network problem occurs in the edge server, finds user information or a client IP using the edge server having the network problem;

the edge server allocating function allocates the one of the at least two alternative edge server IP addresses corresponding to the found user information or client IP address according to the edge server IP allocation matrix; and the DNS responding function provides the one of the at least two alternative edge server IP addresses allocated for the found user information or client IP address to the client regardless of the DNS query.

12. The system of claim 8, wherein the client includes an agent that transmits the DNS query in order to re-connect with another edge server allocated according to the edge server IP allocation matrix when the network problem occurs in the edge server.

13. The system of claim 12, wherein the agent transmits the DNS query including user information.

14. The system of claim 8, wherein the edge server contained in the paths includes at least one of a program, a server, and a hardware device that have a service relay function or a service function.

15. A non-transitory computer-readable recording medium storing a program for executing the method of claim 1 by a computer.

* * * * *

UNITED STATES PATENT AND TRADEMARK OFFICE
CERTIFICATE OF CORRECTION

PATENT NO. : 10,411,981 B2
APPLICATION NO. : 15/319684
DATED : September 10, 2019
INVENTOR(S) : Jeong Hoan Seo et al.

Page 1 of 1

It is certified that error appears in the above-identified patent and that said Letters Patent is hereby corrected as shown below:

In the Claims

In Claim 1, Column 18, Line 8, after "allocating" delete "an".
In Claim 8, Column 18, Line 53, delete "mute" and insert --route--, therefor.
In Claim 9, Column 19, Line 40, delete "addresses" and insert --addresses;--, therefor.

Signed and Sealed this
Eighteenth Day of February, 2020

Andrei Iancu
*Director of the United States Patent and Trademark Office*